March 16, 1954 L. J. KIPP 2,672,153
COMBINED TIRE INFLATION AND RELIEF VALVE
Filed Aug. 8, 1952

INVENTOR
Leonard J. Kipp
BY McMorrow, Berman & Davidson
ATTORNEYS.

Patented Mar. 16, 1954

2,672,153

UNITED STATES PATENT OFFICE 2,672,153

COMBINED TIRE INFLATION AND RELIEF VALVE

Leonard J. Kipp, Marysville, Mich.

Application August 8, 1952, Serial No. 303,205

3 Claims. (Cl. 137—226)

This invention relates to tire valves, and more particularly to an improved tire valve of the type provided with means for preventing the excessive build up of air pressure in the tire associated therewith.

The main object of the invention is to provide a novel and improved pressure-regulating tire valve which is simple in construction, which is reliable in operation, and which prevents the air pressure in the tire associated therewith from building up beyond a predetermined value.

A further object of the invention is to provide an improved pressure-governing tire valve which involves inexpensive components, which is sturdy in construction, and which is arranged to substantially eliminate the dangers of over inflation of the tire with which it is employed by providing an automatic escape means for the air in the tire when the pressure of the air builds up beyond a predetermined maximum value.

Further objects and advantages of the invention will become apparent from the following description and claims, and from the accompanying drawings, wherein:

Figure 1:
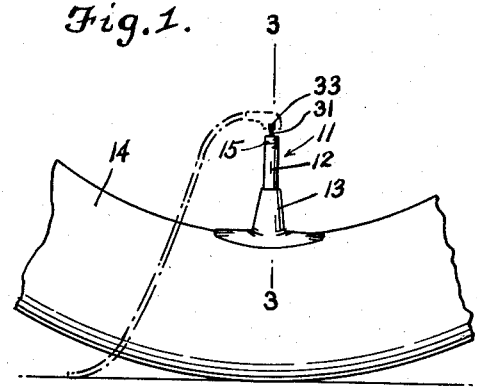
Figure 1 is a fragmentary side elevational view of an automobile inner tube provided with an improved pressure-governing tire valve constructed in accordance with the present invention.
Figure 2:
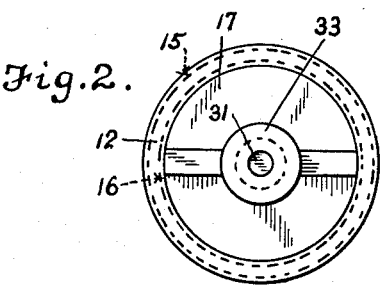
Figure 2 is an enlarged top view of the tire valve employed in Figure 1.
Figure 4:
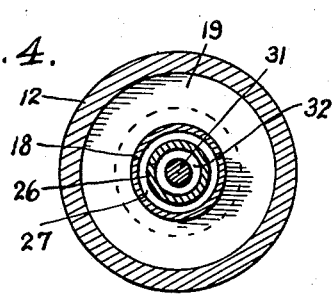
Figure 4 is a horizontal cross sectional view taken on the line 4—4 of Figure 3.
Figure 3:
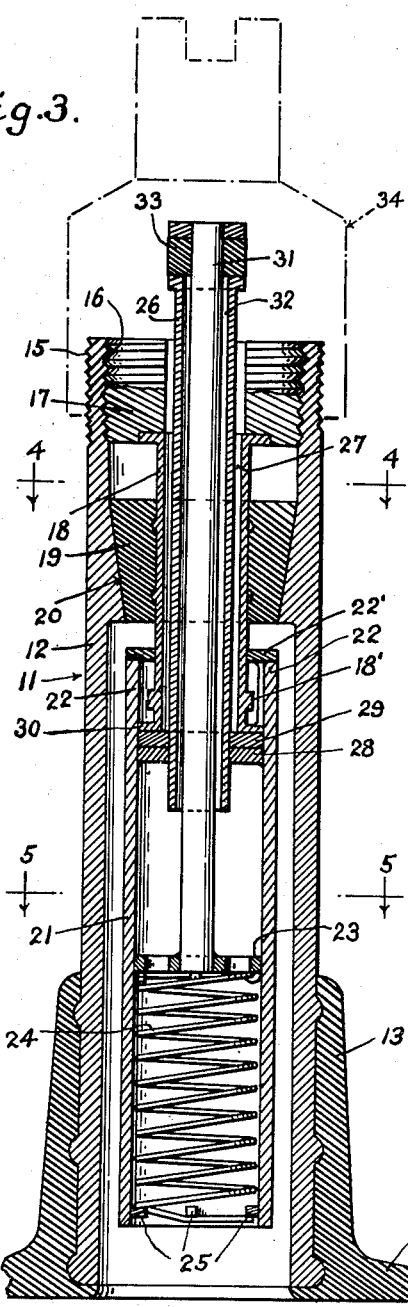
Figure 3 is an enlarged vertical cross sectional view taken on the line 3—3 of Figure 1.

Referring to the drawings, the tire valve is designated generally at 11 and comprises an elongated tubular main housing 12 adapted to be permanently secured in the tire valve neck portion 13 of an inner tube 14, as shown in Figures 1 and 3, the top end of the elongated housing 12 being formed with the outer threads 15 and the inner threads 16. Designated at 17 is an annular disc member which is threadedly engaged with the inner threads 16 and which is thus secured in the top portion of the housing 12. Axially secured to the disc member 17 is the sleeve member 18 which extends downwardly through the upper portion of the housing 12, as shown in Figure 3, and has permanently secured thereto a conical rubber plug element 19 which sealingly engages a conical seat 20 integrally formed in the upper portion of the housing 12. The lower end of sleeve member 18 is provided with a rim 30. Designated at 21 is a downwardly extending cylinder. Cylinder 21 is integrally formed at its top end with the diametrically opposed legs 22, 22, and integrally secured to the top ends of said legs is the annular ring 22' which slidably engages around the sleeve member 18. Said sleeve member 18 is formed with an annular rib 18' below ring 22', whereby downward movement of cylinder 21 relative to sleeve 18 is limited. The cylinder 21 is open at its lower end, as shown in Figure 3. Designated at 23 is an apertured plunger slidably mounted in the cylinder 21. Designated at 24 is a coiled tension spring having its top end secured to the plunger 23 and having its lower end secured to the open lower end of the cylinder 21, as viewed in Figure 3, as by being lockingly engaged with the inwardly projecting radial lugs 25 provided in the lower end portion of the cylinder 21, as shown in Figure 3. The coiled spring 24 biases the apertured plunger 23 to a predetermined position in the cylinder 21, the plunger 23 being movable upwardly when a pressure exceeding a predetermined limiting maximum value is applied therebelow, as will be subsequently explained.

Designated at 26 is a second sleeve member inside the first sleeve member 18 and spaced inwardly therefrom to define an air passage 27 between the sleeve members. Secured to the lower end portion of the second sleeve member 26 is an annular metal seat 28 which is rigidly secured to the inside surface of cylinder 21, said seat 28 being provided with an annular rubber sealing element 29 which is disposed on seat 28 and which is sealingly engageable against the bottom edge of the sleeve member 18 responsive to pressure from below, as will be apparent from Figure 3.

Designated at 31 is a plunger rod which is axially secured to the plunger 23 and which extends vertically upwardly through the sleeve 26 and which defines an inner clearance 32 therewith, as shown in Figure 3. Secured to the top end of the plunger rod 31 is a sealing head of resilient deformable material, shown at 33, which is sealingly engageable with the top end of the sleeve 26 under the normal biasing tension provided by the coiled spring 24.

Figures 5, 6:
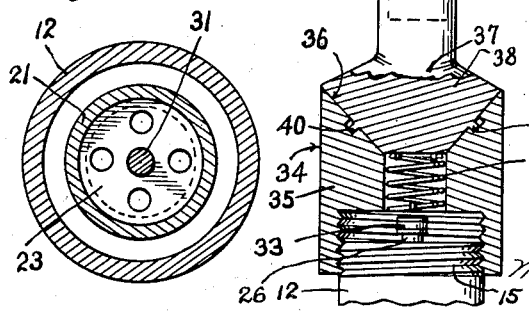
Figure 5 is a horizontal cross sectional view taken on the line 5—5 of Figure 3.
Figure 6 is a vertical cross sectional view taken through the top portion of the valve and the protective cap employed thereon.

Designated in dotted view at 34 in Figure 3 and shown in detail in Figure 6 is a top cap comprising a main housing member 35 threadedly engageable with the external threads 15 of the housing 12 and formed with a conical top seat 36. Designated at 37 is a body member having a conical valve portion 38 engageable in the seat 36 and having the vertical axially extending tip member 39. The valve element 38 is formed with a plurality of lug elements 40 which are loosely engageable in retaining recesses formed in the seat 36, whereby the valve element is normally held against separation from the main body 35 of the cover 34. Designated at 41 is a coiled spring which is housed in the annular main body 35, as shown in Figure 6, the lower portion of the spring being secured to the axial bore of the main body 35 and the top end of the spring being secured to the valve element 38, whereby the valve element 38 is held against separation from the body 35. Said valve element 38 is similarly biased to seating position on the seat 36 and the valve element will not be lifted off the seat unless a predetermined limiting value of air pressure below the valve element is exceeded. This limiting value may be substantially the same value as that which is required to lift the sealing head 33 on the plunger rod 31 off the top end of the sleeve 26.

To inflate the inner tube 14, the cover 34 is removed and the tire inflation implement is engaged on the top end of the housing 12 in the usual manner. Air from the tire inflation apparatus flows through the passage 27 and into the space below rim 30. The air pressure acts on member 29, causing the sleeve 21 to be moved downwardly, said downward movement being limited by the abutment of ring 22' with the rib 18'. This exposes the passages between the legs 22, 22 and allows the air to flow into the inner tube 14. When the tire is properly inflated, the inflation implement is removed and the air pressure, acting from below through the cylinder 21 on the metal seat 28 causes sealing member 29 to engage against the bottom edge of sleeve 18, thus sealing the valve against the escape of air therefrom. If the air pressure in the inner tube 14 exceeds a predetermined maximum value, the air pressure acts through the apertured plunger 23 and the passage 32 on the sealing head 33 and lifts said sealing head off the top rim of the sleeve 26, allowing air to escape therefrom, the air pressure acting on the bottom of the valve element 38 of the cover cap 34 will lift the valve element 38 and allow the air to escape past the valve seat 36 to the atmosphere. Therefore, a means has been provided for automatically providing relief for excessive air pressure which may be built up in the inner tube 14, either by over-inflation, or by any other reason, such as by heating of the tire.

While a specific embodiment of an improved pressure-regulating tire valve has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A tire valve comprising an elongated main housing, a first sleeve member axially and sealingly secured in said main housing, a cylinder slidably secured to the inner end portion of said sleeve member, said cylinder being apertured at both ends, an apertured plunger slidably mounted in said cylinder, spring means biasing said plunger to a predetermined position in said cylinder, a second sleeve member inside the first sleeve member and spaced inwardly therefrom to define an air passage, means sealingly connecting the inner portion of said second sleeve member to said cylinder and being sealingly engageable with the inner end of the first sleeve member, a plunger rod secured to said plunger and extending loosely through the second sleeve member, and a sealing head on the outer end of the plunger rod sealingly engageable with the outer end of the second sleeve member, and urged toward sealing engagement with said last-named outer end by said spring means.

2. A tire valve comprising an elongated main housing, a first sleeve member axially and sealingly secured in said main housing, a cylinder slidably secured to the inner end portion of said sleeve member, said cylinder being apertured at both ends, an apertured plunger slidably mounted in said cylinder, spring means biasing said plunger to a predetermined position in said cylinder, a second sleeve member inside the first sleeve member and spaced inwardly therefrom to define an air passage, means sealingly connecting the inner portion of said second sleeve member to said cylinder and being sealingly engageable with the inner end of the first sleeve member, stop means on the cylinder and on the first sleeve member limiting movement of the cylinder relative to the inner end of the first sleeve member, a plunger rod secured to said plunger and extending loosely through the second sleeve member, and a sealing head on the outer end of the plunger rod sealingly engageable with the outer end of the second sleeve member and urged toward sealing engagement with said last-named outer end by said spring means.

3. A tire valve comprising an elongated main housing, a first sleeve member axially and sealingly secured in said main housing, a cylinder slidably secured to the inner end portion of said sleeve member, said cylinder being apertured at both ends, an apertured plunger slidably mounted in said cylinder, a coiled spring connecting said plunger to the inner end of said cylinder and biasing said plunger to a predetermined position in said cylinder, a second sleeve member inside the first sleeve member and spaced inwardly therefrom to define an air passage, means sealingly connecting the inner portion of said second sleeve member to said cylinder and being sealingly engageable with the inner end of the first sleeve member, stop means on the cylinder and first sleeve member limiting movement of the cylinder relative to the inner end of the first sleeve member, a plunger rod secured to said plunger and extending loosely through the second sleeve member, and a sealing head on the outer end of the plunger rod sealingly engageable with the outer end of the second sleeve member and urged toward sealing engagement with said last-named outer end by said coiled spring.

LEONARD J. KIPP.

References Cited in the file of this patent

UNITED STATES PATENTS

| Number | Name | Date |
| --- | --- | --- |
| 1,114,796 | Nickel | Oct. 27, 1914 |
| 1,137,521 | Noe | Apr. 27, 1915 |